(12) United States Patent
Landry et al.

(10) Patent No.: US 8,050,995 B1
(45) Date of Patent: Nov. 1, 2011

(54) RETIREMENT ON-RAMP

(75) Inventors: Peter J. Landry, Charlotte, NC (US);
Susan S. Thomas, Gastonia, NC (US);
Janet M. Wheeler, Charlotte, NC (US);
David T. Lee, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 226 days.

(21) Appl. No.: 12/472,439

(22) Filed: May 27, 2009

(51) Int. Cl.
*G06Q 40/00* (2006.01)
(52) U.S. Cl. .................................. 705/36 R; 705/14.18
(58) Field of Classification Search ................ 705/14.17, 705/14.18, 35, 36 R, 39, 312
See application file for complete search history.

(56) References Cited

U.S. PATENT DOCUMENTS

| | | | |
|---|---|---|---|
| 5,987,433 A | 11/1999 | Crapo | |
| 7,634,436 B1 | 12/2009 | Wagner | |
| 2002/0198801 A1 | 12/2002 | Dixon | |
| 2004/0177036 A1 | 9/2004 | Nutahara et al. | |
| 2009/0024540 A1 | 1/2009 | Ryder et al. | |

OTHER PUBLICATIONS

International Search Report for International Application PCT/US10/35192, Jul. 8, 2010.

*Primary Examiner* — Mary Cheung
(74) *Attorney, Agent, or Firm* — Weiss & Arons LLP; Michael Springs

(57) ABSTRACT

Apparatus and methods for providing a banking service are provided. The method may use an electronic information processing platform. The method may include storing, in a computer memory, information relating to a current balance in a first customer account. The method may also include storing information relating to a retirement balance. The retirement balance may be a projected balance that will be present in the first customer account upon the customer's retirement. The method may further include storing information relating to a period of time. The period of time may relate to a time span that spans from a predetermined pre-retirement date to a customer's projected retirement date. The systems and methods of the invention may also include activating a series of withdrawals. The series of withdrawals may withdraw funds from the first customer account and deposit the withdrawn funds in a second customer account. The amount of funds withdrawn from the first customer account may increase at least once during the duration of the series of withdrawals. The funds withdrawn from the first customer account may modify the current balance to be similar to the retirement balance at least once during the duration of the series of withdrawals. The amount of funds withdrawn by each withdrawal may be based at least in part on the stored information relating to the current balance, the retirement balance, and the period of time.

12 Claims, 6 Drawing Sheets

(12) United States Patent

RETIREMENT ON-RAMP

FIELD OF TECHNOLOGY

Aspects of the disclosure relate to providing services to financial institution customers through both consumer banking and broker/dealer distribution channels.

BACKGROUND OF THE INVENTION

A customer's retirement income is typically smaller than his income during his working years. For example, a customer's sources of income in retirement may provide for only 70% as much money in retirement compared to pre-retirement. Thus, a customer must modify his retirement budget to be a smaller fraction of his working budget.

Yet, no systems and methods are provided to help a customer adjust to his retirement budget before he retires. This is not desirable at least because it is difficult to adjust to a significantly reduced budget in a relatively short period of time.

It would therefore be desirable to provide systems and methods for helping a customer adjust to his retirement budget before he retires.

SUMMARY OF THE INVENTION

A method for providing an automatic withdrawal service is disclosed. The method may use an electronic information processing platform. The method may include storing, in a computer memory, information relating to a customer's current income. The information may be stored upon the customer's consent to the disclosure of the customer current income information. The method may further include storing information relating to a customer's projected retirement income. The method may also include storing information relating to a period of time. The period of time may relate to a time span that spans from a predetermined pre-retirement date to a customer's projected retirement date. The systems and methods of the invention may also include activating a series of withdrawals. The series of withdrawals may withdraw funds from a customer account. The amount of funds withdrawn by each withdrawal may be based at least in part on the stored information relating to the customer's current income, the customer's projected retirement income, and the duration of the period of time. The withdrawn funds may be deposited in a customer retirement account. The withdrawals may be scheduled or unscheduled and/or allow for alterations and/or adjustments throughout the duration of the automatic withdrawal service.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
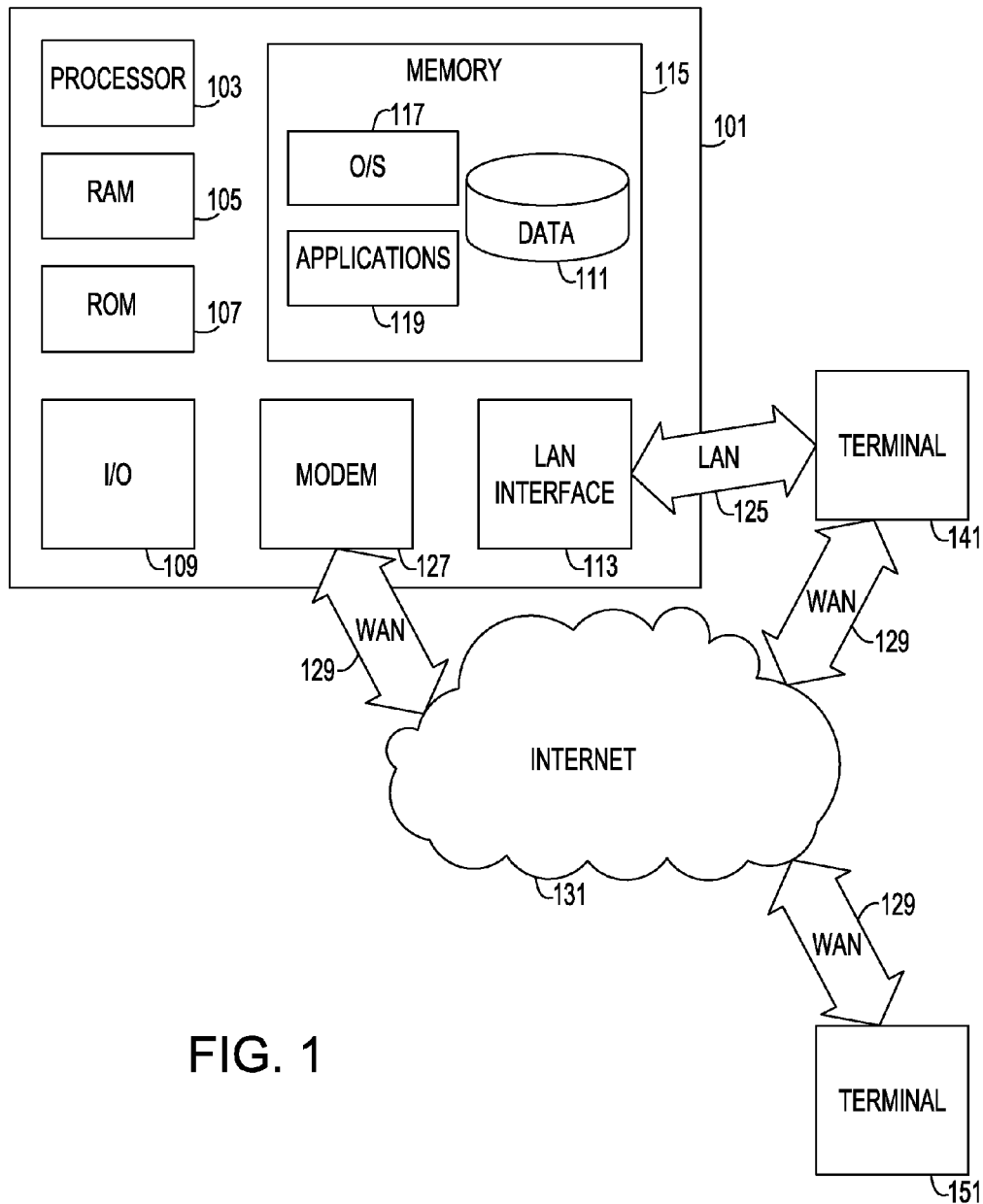
FIG. 1 is a schematic diagram of apparatus that may be used in accordance with the principles of the invention.

This invention relates to an automatic withdrawal of funds from a customer's deposit account. The funds withdrawn from the customer's deposit account may be deposited in a customer savings and/or brokerage account.

The automatic withdrawal of funds as taught by the system and methods of the invention may be used by a customer during his final working years to gradually adjust to a projected retirement budget while accumulating funds for his retirement needs. The automatic withdrawal of funds may also be used by a customer to accumulate assets for personal income needs, personal budget needs, education needs, purchases, an assisted savings plan and/or any other suitable savings and/or spending goal.

For example, a customer may activate the automatic withdrawal service taught by the systems and methods of the invention to assist him in accumulating funds for a down-payment on a home. In this embodiment, the customer can save money to buy the home while slowly adjusting to a reduced income level. Accordingly, a predetermined number of automatic withdrawals may withdraw funds from the customer's deposit account. The withdrawn funds may be deposited in the customer's savings and/or brokerage account. The automatic withdrawals may reduce the customer's income level. This may help the customer adapt to a reduced income level that may occur in the event of his purchasing the home and making mortgage payments.

The automatic withdrawal service taught by the invention may be initiated in-person at a bricks and mortar institution. The initiation of the automatic withdrawal service may require the presence of the customer from whose account(s) funds are to be withdrawn. The system may also be initiated by the customer's authorized representative.

In an alternative embodiment, the automatic withdrawal service may be initiated via an online customer bank account. In this embodiment, initiation of the automatic withdrawal service may be an option, icon and/or webpage displayed in the online customer bank account. A select icon displayed in the customer online bank account may allow the customer to terminate the initiation of the automatic withdrawal service at any point in time.

The initiation of the automatic withdrawal service may be preceded by a thorough analysis of a customer retirement plan. The thorough analysis may be performed during a consultation with a Financial Advisor. The Financial Advisor may establish customer retirement goals and objectives, determine the most appropriate account(s) to be included in the systems and methods of the invention, outline a pre-retirement and retirement income process and/or any other suitable information relating to the automatic withdrawal service.

The initiation of the automatic withdrawal service may include the customer providing selections and answers to questions and options. The questions and options may relate to one or more parameters of the automatic withdrawal service, relevant personal information and/or any other suitable information needed to initiate the process taught by the systems and methods of the invention. It should be noted that the customer may modify information provided during the initiation of the automatic withdrawal service throughout the duration of the automatic withdrawals.

A customer may authorize a financial representative and/or computerized program to access and review customer financial history, historical data and/or transaction history. The financial representative and/or computerized program may use the data to assist the customer in determining suitable parameters relating to the automatic withdrawal service. For example, the suitable parameters may relate to an amount of funds to be withdrawn from the deposit account, a rate of increase of the funds withdrawn and/or a time span during which the withdrawal of funds is to occur.

Should the customer select a parameter relating to the automatic withdrawal service that may generate an adverse impact on a customer account, customer credit standing, or any other customer status, an electronic flag and/or warning may be displayed in the customer online bank account. The electronic flag and/or warning may notify the customer of the adverse impact that may be caused by the selected parameter and allow him to select an alternative parameter. For example, a customer may select to remove funds from a qualified account before age 59½. In this embodiment, a warning may appear in the customer online bank account with text explaining the impact of the undesirable selection.

In one embodiment, the customer may provide additional information to assist the financial representative and/or computerized program to assess his financial needs. Additional information pertaining to a customer retirement budget and/or customer retirement plans may be provided as well.

In certain embodiments of the invention, a life event may trigger a desire on the part of the customer to deactivate the automatic withdrawal service. For example, a medical illness, tax payments and/or fluctuation in income level may require the customer to deactivate his automatic withdrawal service. The customer may select for the life event to trigger the automatic deactivation of his automatic withdrawal service. Alternatively, the customer may provide information pertaining to a life event whose occurrence he desires to trigger an automatic modification of his automatic withdrawal service. For example, a lack of payroll deposits in the deposit account due to a loss of employment may deactivate the automatic withdrawal service.

The customer may be required to meet predetermined conditions to qualify for some or all of the services provided by the automatic withdrawal service. In addition, the customer may be required to pay a service initiation fee and/or a service maintenance fee during the activation and/or duration of the automatic withdrawal service. In the event of a customer terminating his automatic withdrawal service before the elapse of a predetermined time span, the customer may be charged a termination fee. The termination fee may be in addition to the service initiation and/or maintenance fee.

Upon the activation of the automatic withdrawal service, the withdrawal of funds from the deposit account may occur upon a first occurrence of a predetermined event. The predetermined event may be an event whose occurrence may trigger an automatic withdrawal of funds from the deposit account. Alternatively, the withdrawal of funds from the deposit account may occur upon the elapse of a predetermined time span and/or a predetermined number of occurrences of the predetermined event.

It should be noted that the deposit account may be a customer account at a financial institution. The deposit account may be a checking account, savings account, money market account, investment account, brokerage account, or any other suitable account. It should additionally be noted that the systems and methods of the invention may include two or more deposit accounts from which funds are to be withdrawn.

Funds may be withdrawn from the deposit account upon the occurrence of the predetermined event. The predetermined event may be a predetermined deposit of funds in one or more customer accounts, or a combination of predetermined deposits of funds in one or more customer accounts. The predetermined deposit of funds may be characterized by deposit information, the day of the deposit, whether the deposit is a direct deposit, or any other suitable characterization.

The deposited funds may be, but are not limited to, checks, employer direct deposit, investment income, government subsidies and/or rent. The funds may be deposited automatically or manually.

For example, an exemplary customer may select an option for funds to be withdrawn from his deposit account when a direct deposit labeled 'payroll' has been deposited in his deposit account.

Alternatively, funds may be withdrawn from the deposit account based on a calendar frequency such as the day of the week, month and/or year. In one embodiment of the invention, one or more parameters that characterize the predetermined event may be customized by the customer.

The withdrawal of funds from the deposit account may occur during a time span of a number of months, 1-5 years, or more than six years. In one embodiment, the customer may select the duration of the automatic withdrawal service from a list of predetermined options. Alternatively, the duration of the automatic withdrawal service may be customizable.

In an exemplary embodiment of the invention, a customer may select an option displayed in a customer online bank account for funds to be automatically withdrawn from a customer deposit account on the first and fifteenth of every month. The customer may also select an option for the amount of funds withdrawn from the customer deposit account to increase every six months. The customer may additionally select parameters relating to the rate of increase of the withdrawn funds.

The amount of funds withdrawn from the deposit account may increase upon each withdrawal of funds from the deposit account. Alternatively, the amount of funds withdrawn from the deposit account may be constant for a predetermined time span, after which the amount of funds withdrawn from the deposit account may increase. In one embodiment, the amount of funds withdrawn from the deposit account may remain constant until a predetermined number of occurrences of the predetermined event have taken place, after which the amount of funds withdrawn from the deposit account may increase.

The amount of funds withdrawn from the deposit account may increase linearly or non-linearly. Alternatively, the amount of funds withdrawn from the deposit account may decrease with time. In this embodiment, the rate of decrease may be linear or non-linear. In another embodiment, the amount of funds withdrawn from the deposit account may increase and subsequently decrease and/or decrease and subsequently increase one or more times. In an exemplary embodiment, the amount of funds withdrawn from the deposit account may increase until the amount of withdrawn funds is similar to a predetermined amount. When the amount of withdrawn funds is similar to the predetermined amount, the amount of withdrawn funds may remain substantially constant for the remainder of the duration of the automatic withdrawal service.

It should be noted that one or more of the parameters that characterize the withdrawal of funds from the deposit account may be selected and/or customized by the customer or the customer's authorized representative.

The funds withdrawn from the deposit account may be deposited in a savings and/or brokerage account. The account may be an account of the customer who owns the deposit account, or an account of a different customer. In one embodiment, the savings and/or brokerage account may be an account at a financial institution that is different from the financial institution of deposit account.

The savings and/or brokerage account may be a savings account, deposit account, investment account, IRA, 529 plan, mutual fund account, insurance contract, annuity, trust, money market account, charity account and/or any other suitable account.

It should be noted that in the embodiment of multiple deposit accounts (referred to hereafter as 'multiple accounts'), one or more predetermined events may characterize the withdrawal of funds from the multiple accounts.

In another embodiment of multiple accounts, the withdrawal of funds from a first account may be initiated by a predetermined event that is different from the predetermined event that initiates that withdrawal of funds from a second account. It should additionally be noted that the amount of funds withdrawn from the first account may be different from the amount of funds withdrawn from the second account. The funds withdrawn from the first and second account may be withdrawn at different times and/or increase at different rates. In addition, funds withdrawn from the first and second account may be deposited in different savings accounts.

The systems and methods of the invention may include one or more events whose occurrence may modify the automatic withdrawal service. A change in a customer deposit schedule, deposit amount, income level, a negative balance, a balance below a predetermined value, a fluctuation in currency and/or any other suitable event may modify one or more parameters relating to the withdrawn funds or any other suitable parameter relating to the automatic withdrawal service. Modification of the one or more parameters relating to the automatic withdrawal service may generate a customer notification displayed in a customer online bank account and/or a notification related through a Financial Advisor.

In the event of a withdrawal funds from the savings and/or brokerage account, a synthetic fee may be charged to the customer. The synthetic fee may discourage the customer from withdrawing funds from the savings and/or brokerage account that may adversely impact a customer pre-retirement and/or retirement strategy.

The synthetic fee may withdraw funds from the deposit account and deposit the withdrawn funds into the savings account. The synthetic fee may be greater than the amount of funds withdrawn from the savings account. The synthetic fee may be activated and/or customized by customer during the initiation and/or duration of the automatic withdrawal service.

In one embodiment, one or more parameters of the automatic withdrawal service may be modified in the event of a withdrawal of funds from the savings and/or brokerage account. In an exemplary embodiment, the amount of funds withdrawn from the checking account by the automatic withdrawal system may increase upon the withdrawal of funds from the savings account. This increase may allow the customer to meet his financial goal (i.e. an amount of funds the customer desires to be deposited in the savings account upon the completion of the automatic withdrawal service) despite the withdrawal of funds from the savings account.

The systems and methods of the invention may include one or more methods of communication between the customer and the financial institution providing the automatic withdrawal service. The communication may be executed via e-mail, hardcopy, telebanking, a customer online bank account and/or in-person at a financial institution.

The communication may include, but is not limited to, bank statements, brokerage statements, actual to goal reporting, alerts and/or visual representations of the customer's automatic withdrawal service and/or his progression towards his financial goal. The communication may be based on a customer selection identifying a customer preferred method of communication.

The communication may further include online and/or in person help to provide advice pertaining to the automatic withdrawal service, the customer's progression towards his financial goal and/or any other helpful financial information.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for customer information; automatic withdrawal service information, and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by an administrator to open, view and process customer information and to issue one or more instructions regarding the automatic withdrawal service. Customer information may be stored in memory 125. The customer information may be processed by an application such as one of applications 119.

Figure 2:
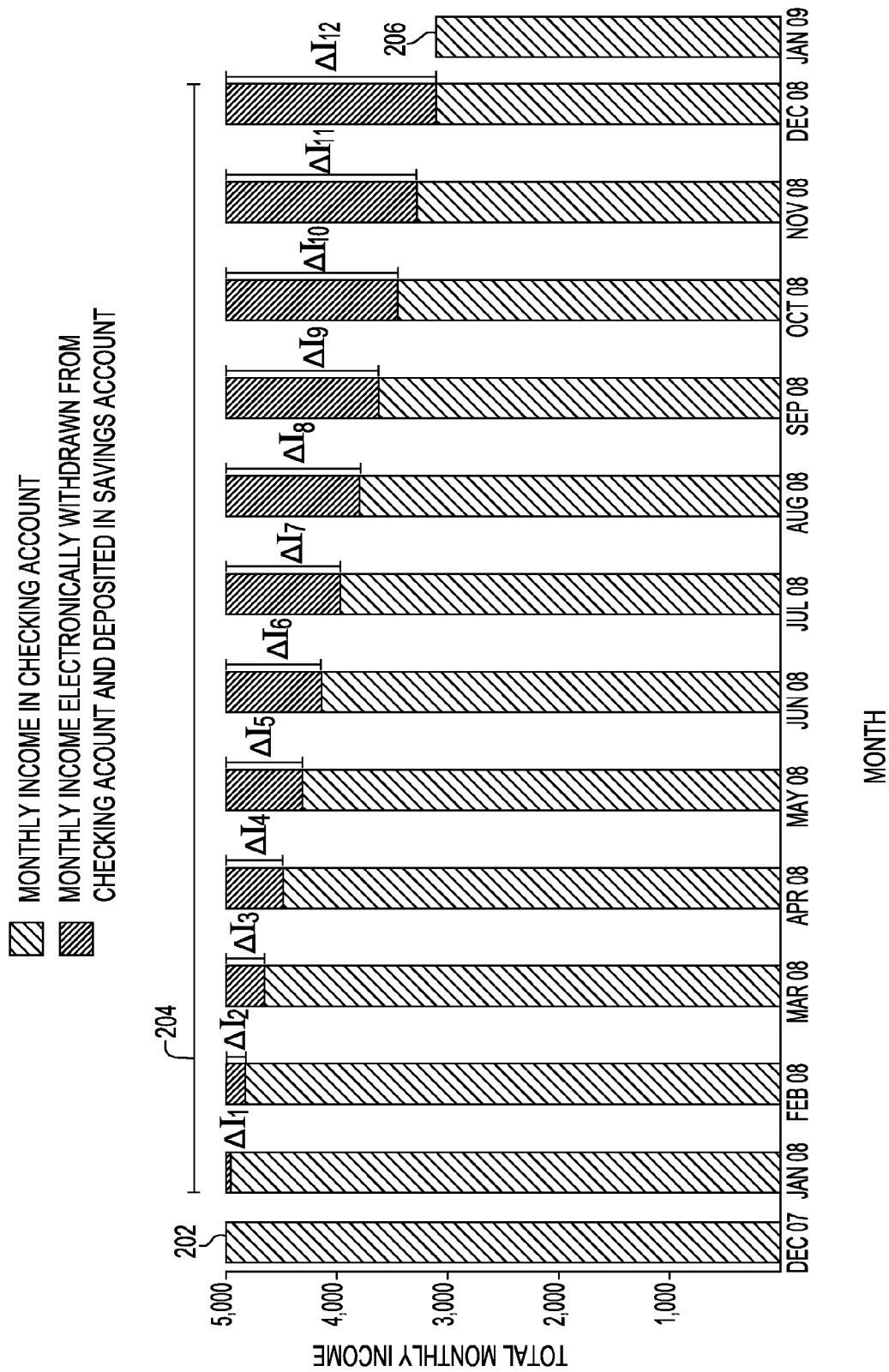
FIG. 2 shows an illustrative diagram of a process for reducing funds in a customer's checking account over a one-year period.

FIG. 2 shows an illustrative diagram of a process for automatically withdrawing funds from a customer's checking account in one embodiment of the systems and methods of the invention. Illustrative bar 202 may illustrate a customer monthly income deposited in a customer's checking account prior to the activation of the automatic withdrawal service. Illustrative bars 204 may illustrate the customer's remaining monthly income in the customer's checking account upon activation of the automatic withdrawal service. As illustrated in illustrative bars 204, progressively larger amounts of funds may be withdrawn monthly from the customer's checking account. The withdrawn funds may be deposited in a customer's savings account. In this illustration, the automatic withdrawal service is active for a twelve-month period. Illustrative bar 206 may illustrate the customer's monthly income deposited in the customer's checking account upon the customer's retirement.

FIG. 2 illustrates the gradual increase of funds withdrawn from the customer's checking account in one embodiment of the systems and methods of the invention. The final amount of funds withdrawn from the customer's checking account is similar to the budget deficit created by the customer's retirement. At least this characteristic of the embodiment illustrated in FIG. 2 may assist the customer in slowly adjusting to a reduced budget prior to his retirement while accumulating assets in his savings account of a value $\Sigma(i=1 \ldots 12)\Delta I_i$ for his retirement needs.

Figure 3:
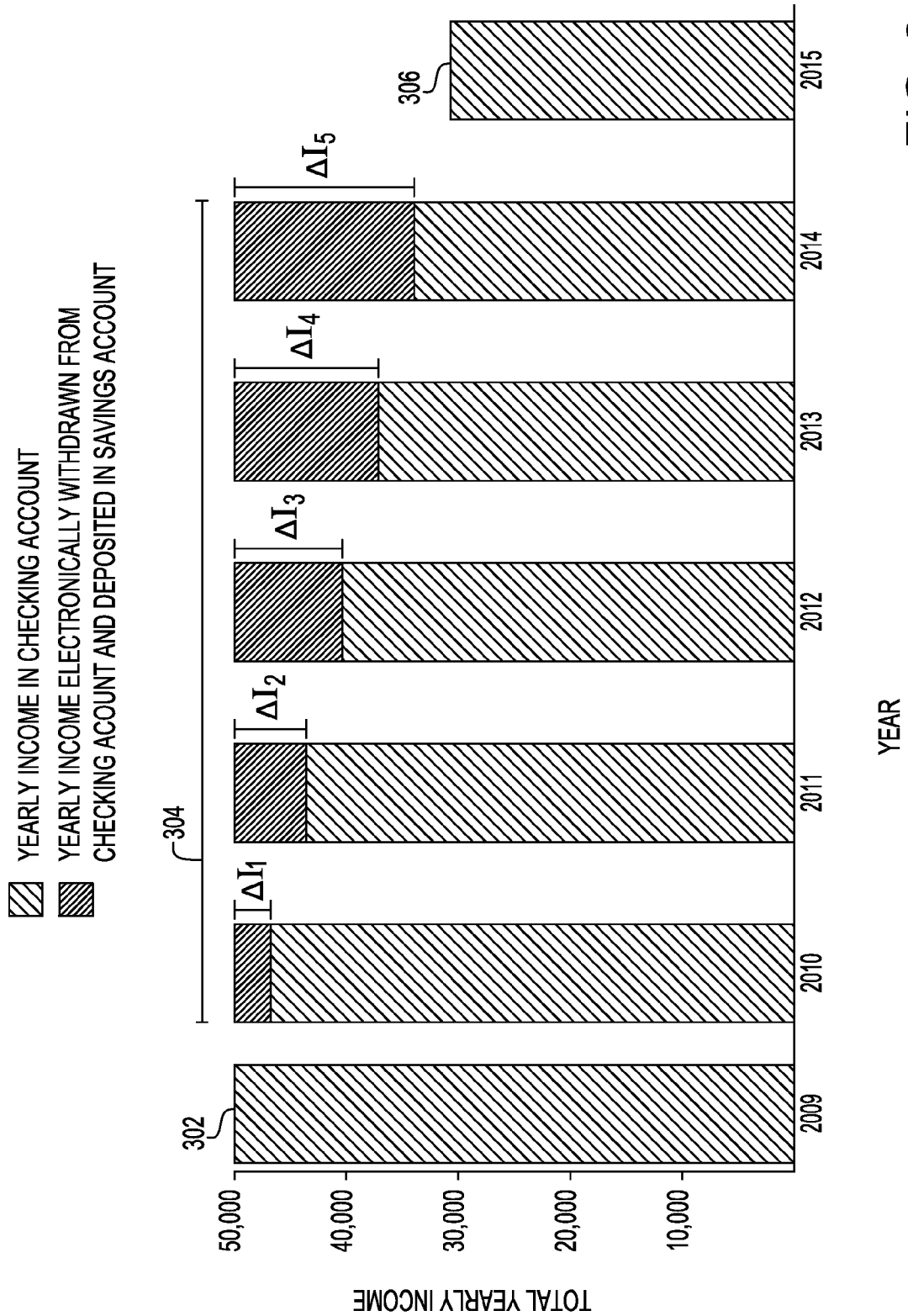
FIG. 3 shows an illustrative diagram of a process for reducing funds in a customer checking's account over a five-year period.

FIG. 3 shows an illustrative diagram of a process for gradually reducing funds in a customer's checking account over a five-year period. Illustrative bar 302 may illustrate a customer's yearly income deposited in a customer's checking account prior to the activation of the automatic withdrawal service. Illustrative bars 304 may illustrate the customer's remaining yearly income in the customer's checking account upon activation of the automatic withdrawal service. As illustrated in illustrative bars 304, progressively larger amounts of funds may be withdrawn from the customer's checking account. The withdrawn funds may be deposited in a customer's savings account. In this illustration, the automatic withdrawal service is active for a five-year period. Illustrative bar 306 may illustrate a customer's yearly income deposited in the customer's checking account upon the customer's retirement.

FIG. 3 illustrates the gradual increase of funds withdrawn from the customer's checking account in one embodiment of the systems and methods of the invention. The final amount of funds withdrawn from the customer's checking account is similar to the budget deficit created by the customer's retirement. At least this characteristic of the embodiment illustrated in FIG. 3 may assist the customer in slowly adjusting to a reduced budget prior to his retirement while accumulating assets in his savings account of a value $\Sigma(i=1 \ldots 5)\Delta I_i$ for his retirement needs.

FIGS. 2-3 illustrate two embodiments of methods for gradually reducing funds in a customer's checking account according to the invention. FIGS. 2-3 illustrate a substantially linear increase of funds withdrawn from the customer's checking account. It should be noted that the systems and methods of the invention also include withdrawing funds from a customer's checking account wherein the amount of funds withdrawn increases non-linearly with time.

Figure 4:
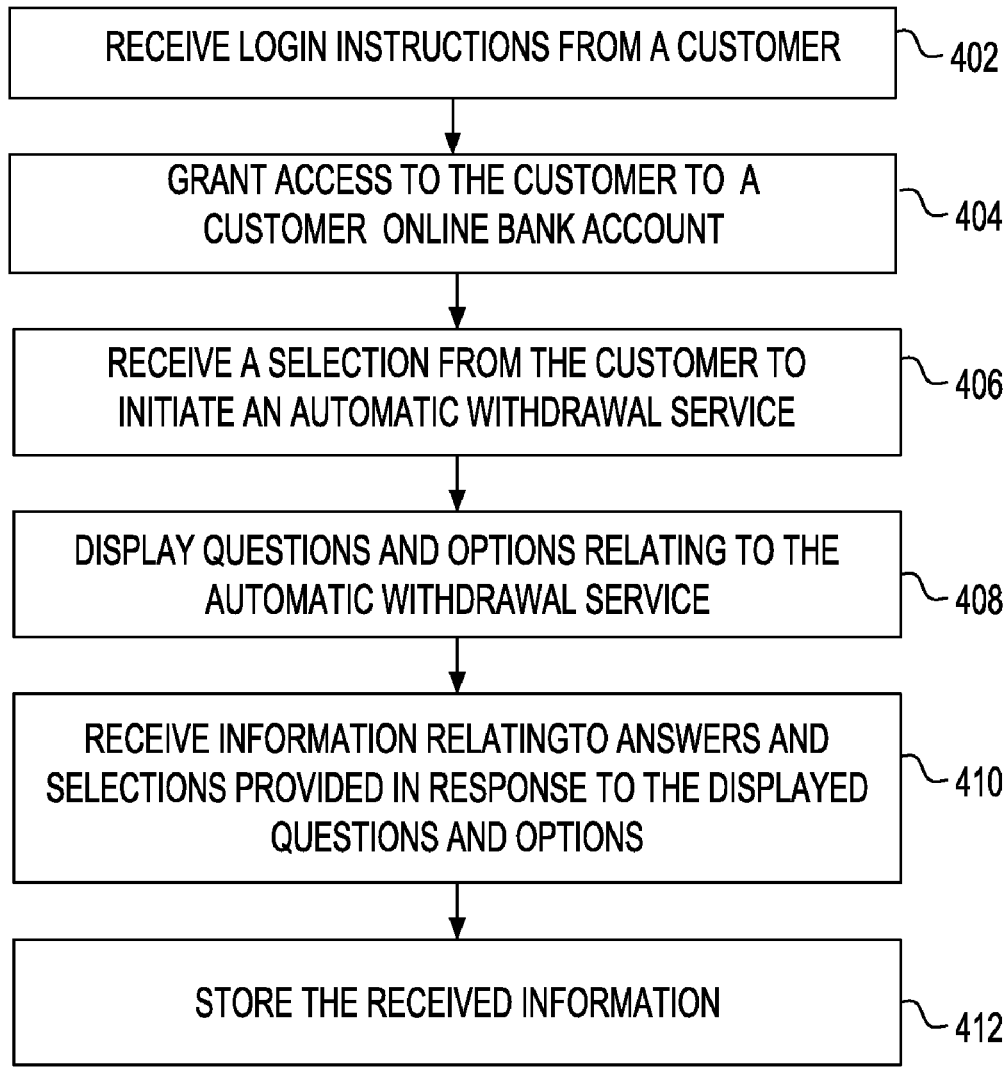
FIG. 4 shows an illustrative flow diagram of a process for initiating an automatic withdrawal service in a customer online bank account as taught by the systems and methods of the invention.
Figure 5:
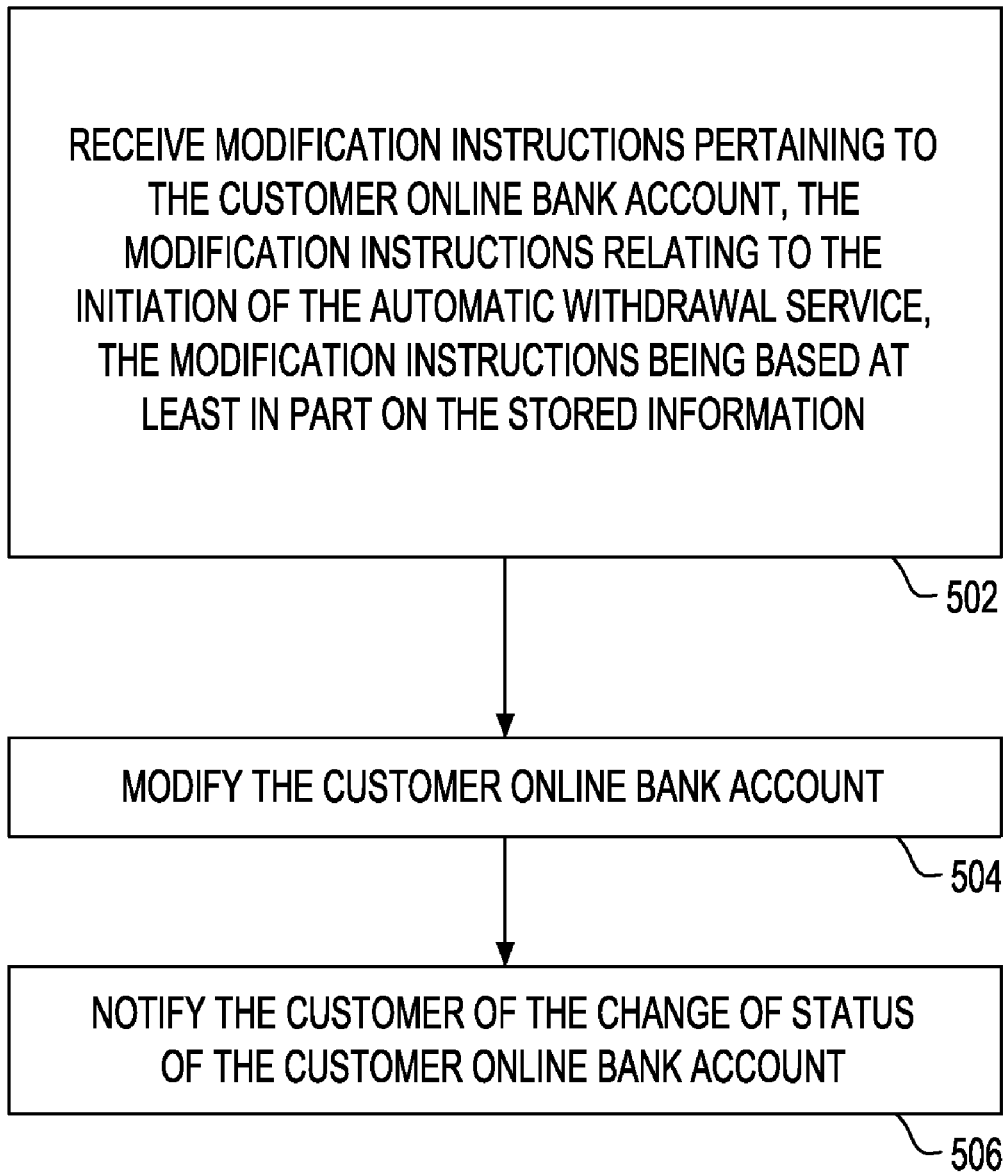
FIG. 5 shows an illustrative flow diagram of a process for modifying a customer online bank account to include the automatic withdrawal service taught by the systems and methods of the invention.
Figure 6:
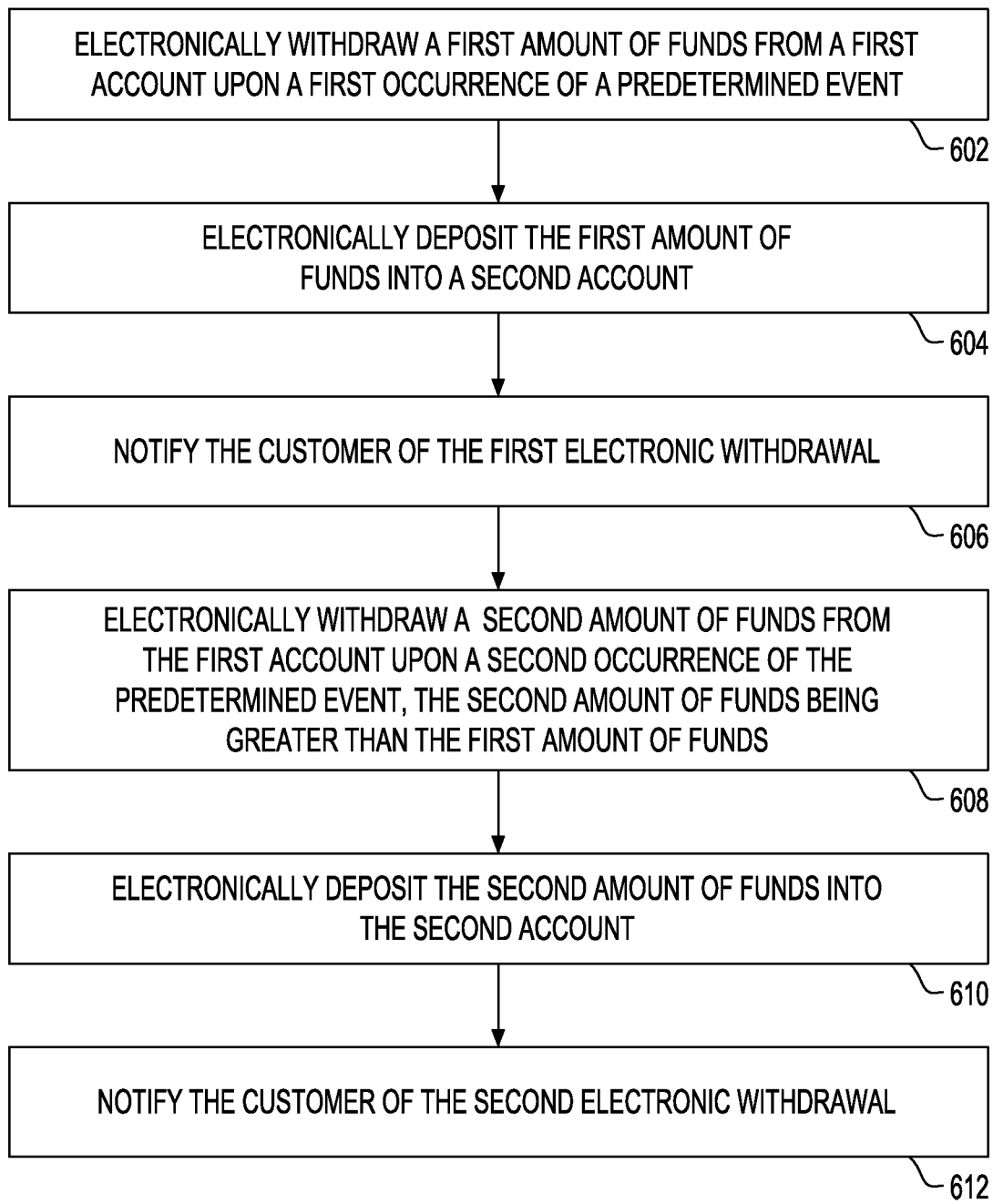
FIG. 6 shows an illustrative flow diagram of the automatic withdrawal service taught by the systems and methods of the invention.

FIGS. 4-6 show flow diagrams that describe in detail a process according to the invention. FIG. 4 shows an illustrative flow diagram of a process for initiating an automatic withdrawal service in a customer online bank account as taught by the systems and methods of the invention. Login instructions may be received from a customer in step 402. Access may be granted to the customer to a customer online bank account in step 404. A selection may be received from the customer to initiate an automatic withdrawal service in step 406. In step 408, questions and options relating to the automatic withdrawal service may be displayed. In step 410, information relating to answers and selections provided in response to the displayed questions and options may be received. The received information may be stored in step 412.

FIG. 5 shows an illustrative flow diagram of a process for modifying a customer online bank account to include the automatic withdrawal service taught by the systems and methods of the invention. In step 502, modification instructions pertaining to the customer online bank account may be received. The modification instructions received may relate to the initiation of the automatic withdrawal service. The modification instructions may be based at least in part on the stored information. In step 504, the customer online bank account may be modified. In step 506, the customer may be notified of the change of status of the customer online bank account.

FIG. 6 shows an illustrative flow diagram of an automatic withdrawal service taught by the systems and methods of the invention. In step 602, a first amount of funds may be electronically withdrawn from a checking account upon a first occurrence of a predetermined event. In step 604, the first amount of funds may be electronically deposited into a second account. In step 606, the customer may be notified of the first electronic withdrawal. In step 608, a second amount of funds may be electronically withdrawn from the checking account upon the second occurrence of the predetermined event. The second amount of funds may be greater than the first amount of funds. In step 610, the second amount of funds may be electronically deposited into the second account. In step 612, the customer may be notified of the second electronic withdrawal.

Thus, systems and methods for providing an automatic withdrawal service have been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more computer-readable media storing computer-executable instructions which, when executed by a processor on a computer system, perform a method for executing an automatic withdrawal service, the method using an electronic information processing platform, the method comprising:

storing information relating to a current balance in a first customer account;

storing information relating to a retirement balance, wherein the retirement balance is a projected balance that will be present in the first customer account upon the customer's retirement;

storing information relating to a period of time, the period of time relating to a time span that spans from a predetermined pre-retirement date to a customer's projected retirement date; and activating a series of withdrawals, the series of withdrawals withdrawing funds from the first customer account and depositing the withdrawn funds in a second customer account, wherein the amount of funds withdrawn from the first customer account increases at least once during the duration of the series of withdrawals, wherein the funds withdrawn from the first customer account modify the current balance to periodically converge on the retirement balance during the duration of the series of withdrawals until the current balance is equivalent to the retirement balance, wherein the amount of funds withdrawn by each withdrawal is based at least in part on the stored information relating to the current balance, the retirement balance, and the period of time; and wherein the total amount of funds withdrawn from the first customer account and deposited in the second customer account is equal to $\Sigma(i=1 \ldots n)\Delta I_i$ wherein i represents the series of withdrawals and $\Delta I_i$ is the amount of each withdrawal.

2. The method of claim 1 wherein the first customer account is a customer checking account.

3. The method of claim 1 wherein the second customer account is a customer savings account.

4. The method of claim 1 wherein the information stored relating to the current balance in the first customer account includes information relating to a first customer income.

5. The method of claim 1 wherein the information stored relating to the retirement includes information relating to a customer retirement income.

6. The method of claim 1 wherein the duration of the series of withdrawals is a 1-5 year period.

7. The method of claim 1 wherein the customer current balance is an average customer current balance.

8. The method of claim 1 wherein each withdrawal is activated upon the occurrence of a predetermined event.

9. The method of claim 8 wherein the predetermined event is based on a calendar frequency.

10. The method of claim 8 wherein the predetermined event is based on a deposit in the customer account.

11. The method of claim 8 wherein the amount of funds withdrawn increases upon a predetermined number of occurrences of the predetermined event.

12. The method of claim 1 wherein the amount of funds withdrawn from the first customer account increases upon the lapse of a predetermined time span.

* * * * *